United States Patent [19]
Mazur

[11] 3,870,209
[45] Mar. 11, 1975

[54] CAMERA CARRYING DEVICE

[76] Inventor: Harry E. Mazur, P.O. Box 4508, Palm Springs, Calif. 92262

[22] Filed: July 30, 1973

[21] Appl. No.: 383,766

[52] U.S. Cl. ............................................... 224/5 V
[51] Int. Cl. .............................................. A45f 5/00
[58] Field of Search .......... 224/5 V, 5 B, 5 R, 26 R, 224/42.45 R, 1 R

[56] References Cited
UNITED STATES PATENTS

| | | | |
|---|---|---|---|
| 2,223,219 | 11/1940 | Mayerovitz | 224/5 V X |
| 2,565,006 | 8/1951 | Trickey | 224/5 V X |
| 3,608,794 | 9/1971 | Mazur | 224/5 V |
| 3,767,095 | 10/1973 | Jones | 224/5 V |

*Primary Examiner*—Albert J. Makay
*Assistant Examiner*—Jerold M. Forsberg
*Attorney, Agent, or Firm*—Warren, Rubin & Chickering

[57] ABSTRACT

A device for supporting and carrying a camera and having a base plate adapted for underlying and attachment to the bottom of the camera, means for demountably fastening the plate and camera, a pair of forwardly positioned upright neck strap engaging arms secured to and extending generally perpendicularly from the base plate adjacent a normally forwardly disposed edge thereof, and camera lens supporting means carried by the base plate between the arms and projecting in a forward direction therefrom and positioned to underlie and support the camera body contiguous to the lens support thereof. The base plate is provided with openings affording access to the lock for the demountable camera back and to the film release button. Additionally, the neck strap is arranged to provide a steady-state triangular camera supporting position.

4 Claims, 7 Drawing Figures

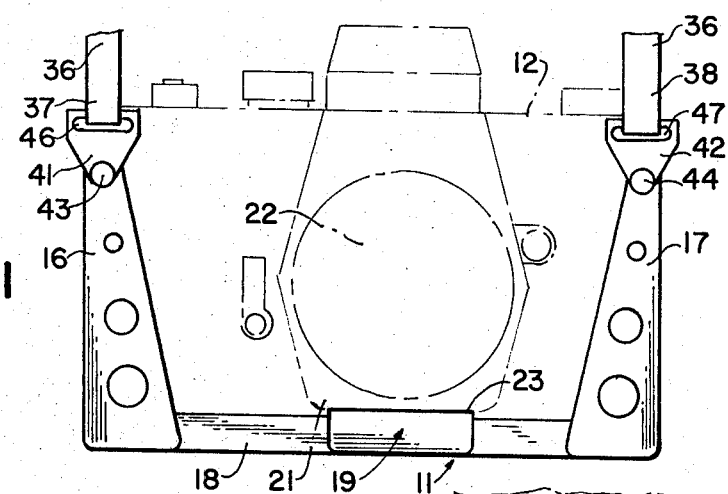
FIG.-1
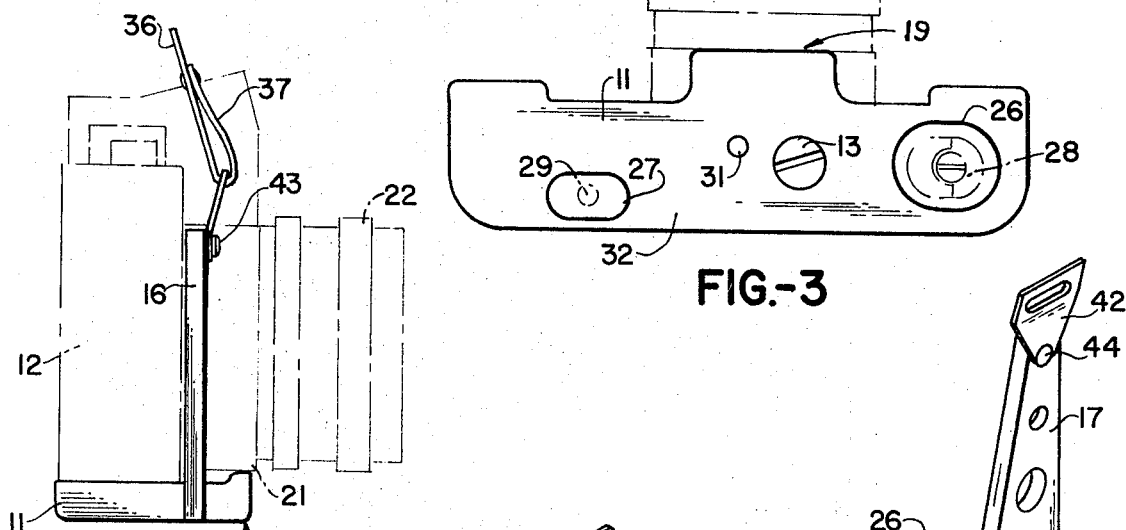
FIG.-2
FIG.-3
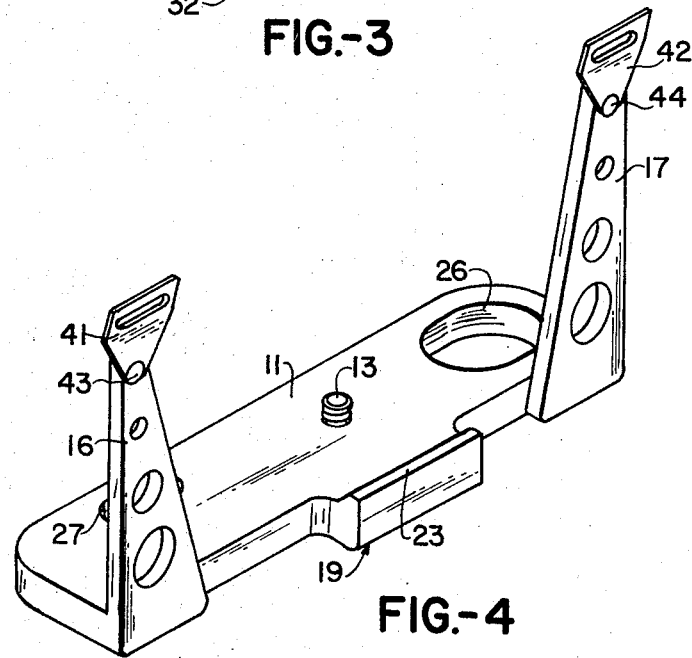
FIG.-4

CAMERA CARRYING DEVICE

The invention relates to camera carrying devices and, more particularly, to improvements made in my earlier device as disclosed in U.S. Pat. No. 3,608,794.

Customary leather camera carry cases add substantially to the bulk size of the camera, are frequently cumbersome and awkward to use, and have become increasingly costly. A significant step toward simplicity, ease of portability and use, and lightness in weight was made by the camera carrying device disclosed in the aforementioned patent. However, both the conventional camera case and the earlier form of camera carrying device have required that the camera carrying device be detached before the camera may be opened up for reloading of film or even before the exposed film can be rewound into its cartridge. As a feature of the present invention, both of the noted functions may be performed while the camera carrying device is attached to the camera, thus not requiring the disassembly of the associated carry device and camera when rewinding the film or reloading the camera.

Another disadvantage of prior devices has been the absence of any direct support for the camera lens. Cameras having long lenses, such as telescopic lenses, tend to have an unsteady support in their carrying case or device. It is a feature and an object of the present invention to provide a camera carrying device of the character described which has an integral lens supporting structure designed for direct support of the camera body contiguous to the lens support thereof.

Another object of the present invention is to provide a camera carrying device of the character above which will afford a braced, steady-state, triangular support for the camera in picture taking position.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings:

FIG. 1 is a front elevation of a camera carrying device constructed in accordance with the present invention;

FIG. 2 is an end elevation of the device;

FIG. 3 is a bottom view of the device;

FIG. 4 is a perspective view of the device;

Figure 6:
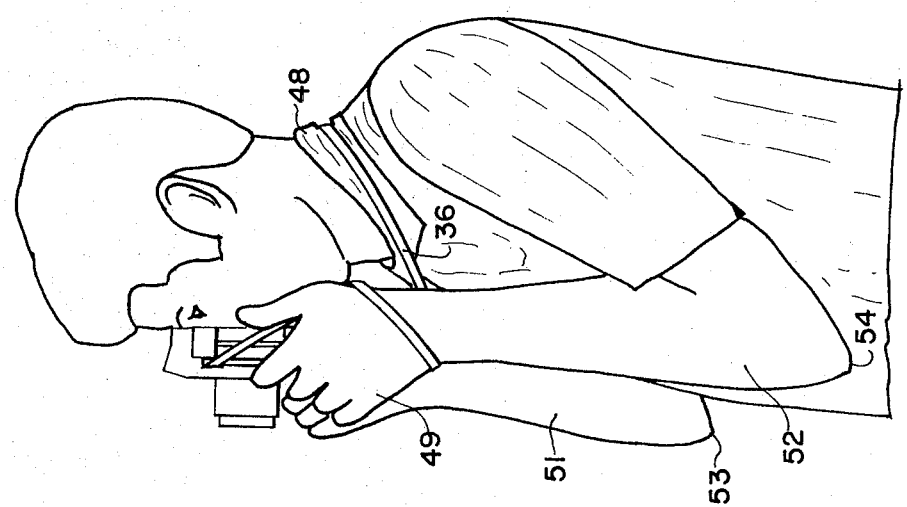
FIG. 6 is a side elevation of the device depicted in another position of use.

The camera carrying device of the present invention comprises briefly a base plate 11 adapted for underlying and attachment to the bottom of a camera body 12; means 13 for demountably fastening plate 11 to the camera bottom; a pair of forwardly positioned upright neck strap engaging arms 16 and 17 secured to and extending generally perpendicularly from plate 11 adjacent a normally forwardly disposed edge 18 thereof; the improvement herein especially comprising camera supporting means 19 carried by base plate 11 and projecting in a normally forward direction therefrom and positioned to underlie and support the camera body portion 21 contiguous to, and providing support for, the forwardly projecting camera lens 22. More particularly, means 19 here comprises a tongue portion integrally formed with base plate 11 and extending laterally therefrom substantially in the plane of the base plate and between arms 16 and 17 in alignment with the optical axis of the camera. In the type of camera with which the present device is adapted for use, the lens mounting part 21 extends forwardly of the camera body 12 for engagement by means 19. In the camera here shown, Nikon F-2, the lens supporting portion 21 has a flat underside and, accordingly, tongue 19 is formed with a raised flat lip 23 dimensioned and positioned to directly engage and support the flat underside of portion 21. In other cameras, portion 21 may have a round or other configuration and in such instance the present device designed for use with such camera will have a complementary shaped lip 23. The engagement and support of the lens mounting part by base portion 19 reinforces the camera body against flexing, thus maintaining proper optical alignment of the body with a lens mounted on part 21. Means 13 here comprises a screw dimensioned and threaded to fit the threaded opening customarily provided in the bottom of the camera body for attachment to a carrying case, tripod or the like. Base plate 11 is dimensioned to substantially cover, reinforce and protect the camera base against denting or other damage to the case and adjacent internal camera parts.

As a feature of the present invention, base plate 11 is formed with openings 26 and 27 which are sized and positioned to register with the manually engageable lock 28 positioned at the bottom of the camera body for securing the camera back, and the manually engageable film release button 29 similarly positioned on the camera bottom spaced from lock 28. As will be seen from FIG. 4, opening 26 is sufficiently large to permit positioning of the user's fingers therethrough to engage, displace and rotate the lock 28 for removal of the demountable camera back for inserting and removing the film cartridge. Similarly, opening 27 is sufficiently large for insertion of the user's finger therethrough to engage and displace the conventional film release button 29 for permitting rewinding of the exposed film into its cartridge. Accordingly, both of these operations, rewinding of the film and removal and replacement of film, may be accomplished without the requirement of removing the present device from the camera bottom.

As another feature of the present device, there is provided in the base plate 11 a threaded opening 31 opening to the bottom surface 32 of the plate, see FIG. 3, and which is dimensioned and threaded to receive the customary tripod fastening screw (not shown). Since the device of the present invention is generally customized for use with a particular camera, opening 31 may be, and is here, located at the bottom balance point of the combined device and camera, thus providing optimum stability of the camera when tripod mounted.

Figure 7:
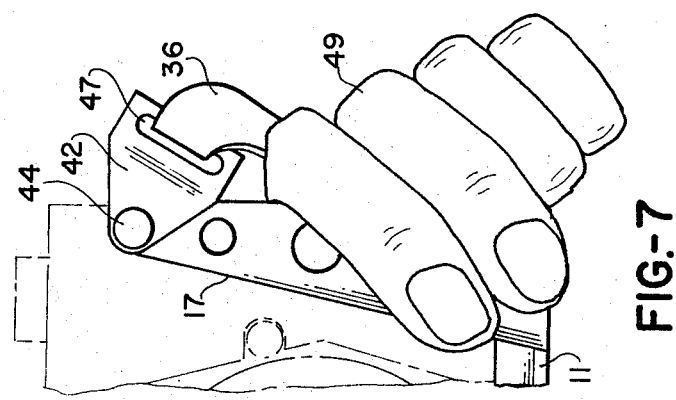
FIG. 7 is a fragmentary front elevation on an enlarged scale showing position of parts in use.
Figure 5:
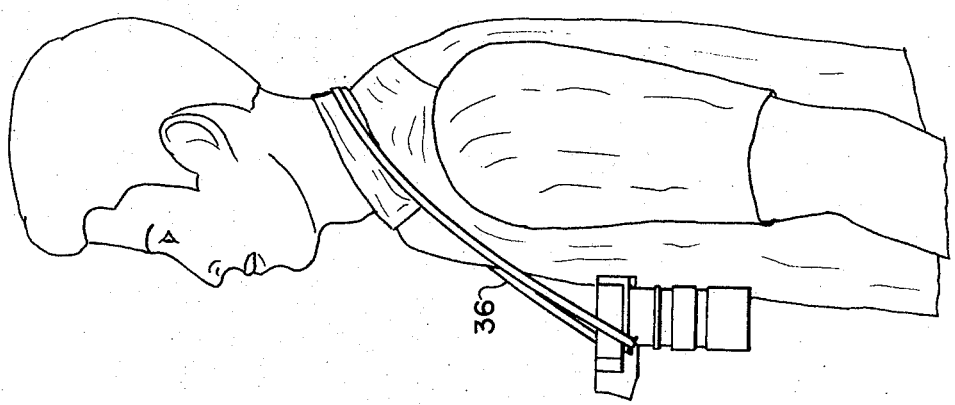
FIG. 5 is a side elevation of the device depicted in one position of use.

The present device will also permit the user, as depicted in FIG. 6, to brace the camera in a steady-state position for picture taking. This is accomplished in part by the mounting and length of neck strap 36. As will be best seen in FIGS. 1, 2, 4 and 7, the opposite ends 37 and 38 of the strap are secured to brackets 41 and 42 hinged to the upper ends of arms 16 and 17 by pins 43 and 44 to provide a swivel action in the plane of the arms 16-17. End loops 37 and 38 on the straps, formed as seen in FIG. 2, may be extended through strap receiving slots 46 and 47 provided in swivel members 41 and 42. Accordingly, members 41 and 42 may be swung to an upright position, as seen in FIG. 1 for carrying the camera, or they may be swung to the side as seen in FIG. 7, to support the device either in an inverted carrying position of the camera, as seen in FIG. 5, or for the holding of the camera as seen in FIG. 6. An advantage of supporting the camera in its inverted position, as seen in FIG. 5, is that the lens and light sensing openings of the camera are covered and shaded and protected against accidental contact and injury.

In the camera holding position depicted in FIG. 6, the camera will be securely braced in picture taking position at eye level by the neck strap 36 and the use and disposition of the user's hands and arms. Particularly, the neck strap is designed of a predetermined length such that when placed behind the neck 48 of the user and extended around the user's hands 49, in the manner shown in FIG. 6, the strap will be foreshortened to bring the camera view opening to eye position. At the same time the user's forearms 51 and 52 may be vertically disposed to bring his elbows 53 and 54 to a rest position against his body, to thus provide in the configuration of the taut neck strap 36 and the arms and body of the user, a steady-state triangular camera supporting position, particularly useful in taking pictures at slow shutter speeds.

I claim:

1. A device for carrying a camera having a body including a bottom and a lens mounting part extending forwardly of said body comprising:
    a base plate adapted for underlying and attachment to said camera bottom for protection of said body;
    means for demountably fastening said plate to said camera bottom;
    a pair of upright arms secured to and extending generally perpendicularly from said plate;
    a neck strap connected to the upper ends of said arms for free hanging support of said device and camera from the neck of the user with said plate underlying and supporting the bottom of the camera body; and
    said plate being formed with an integrally forwardly projecting portion medially between said arms and projecting forwardly of said arms and being formed to underlie, engage and support said camera lens mounting part for preventing flexing of said camera body thus maintaining proper optical alignment of said body with a lens mounted on said part.

2. A device as defined in claim 1, said camera having an optical axis and said plate portion being aligned with said optical axis and having a normally upper surface shaped to fit with and support the normally bottom side of said lens mounting part.

3. A device as defined in claim 2, said camera body having a demountable back and a manually engageable lock therefor located at said bottom and a manually engageable film release button at said bottom spaced from said lock; and
    said base plate having openings therein registering with said lock and button for providing access thereto when said plate is secured to said camera bottom.

4. A device as defined in claim 3, said plate being formed with a threaded tripod crew fastening opening at substantially the bottom balance point of the combined device and camera.

* * * * *

UNITED STATES PATENT OFFICE
CERTIFICATE OF CORRECTION

PATENT NO. : 3,870,209
DATED : March 11, 1975
INVENTOR(S) : Harry E. Mazur

It is certified that error appears in the above-identified patent and that said Letters Patent are hereby corrected as shown below:

Column 4, Claim 4, Line 33, change "crew" to ---screw---.

Signed and Sealed this twenty-first Day of October 1975

[SEAL]

Attest:

RUTH C. MASON
Attesting Officer

C. MARSHALL DANN
Commissioner of Patents and Trademarks